United States Patent
Nagar et al.

(10) Patent No.: US 12,277,025 B2
(45) Date of Patent: Apr. 15, 2025

(54) DYNAMIC ALERT SUPPRESSION POLICY MANAGEMENT

(71) Applicant: International Business Machines Corporation, Armonk, NY (US)

(72) Inventors: Seema Nagar, Bangalore (IN); Harshit Kumar, Delhi (IN); Ruchi Mahindru, Elmsford, NY (US); Amitkumar Manoharrao Paradkar, Mohegan Lake, NY (US); Pooja Aggarwal, Bengaluru (IN); Karan Bhukar, Jaipur (IN); Ian Manning, Church Hill (IE); Matthew Richard James Thornhill, London (GB); Rohan R. Arora, Champaign, IL (US); Stephen James Hussey, Orange, CA (US); Franco Forti, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 50 days.

(21) Appl. No.: 18/354,226

(22) Filed: Jul. 18, 2023

(65) Prior Publication Data

US 2025/0028589 A1  Jan. 23, 2025

(51) Int. Cl.
*G06F 11/00* (2006.01)
*G06F 11/07* (2006.01)

(52) U.S. Cl.
CPC ........ *G06F 11/079* (2013.01); *G06F 11/0793* (2013.01)

(58) Field of Classification Search
CPC ............................ G06F 11/079; G06F 11/0793
USPC ................................................ 714/1–57, 746
See application file for complete search history.

(56) References Cited

U.S. PATENT DOCUMENTS

| | | | |
|---|---|---|---|
| 7,568,027 B2 | 7/2009 | Becker et al. |
| 8,495,661 B2 | 7/2013 | Carey et al. |
| 8,898,299 B2 | 11/2014 | Atkins et al. |
| 10,116,675 B2 | 10/2018 | Brown et al. |
| 10,334,085 B2 | 6/2019 | Hsiao et al. |
| 11,115,505 B2 | 9/2021 | Hsiao et al. |

(Continued)

FOREIGN PATENT DOCUMENTS

CN   112181960 A   1/2021

OTHER PUBLICATIONS

"AIOps; Why Event Noise Reduction and Predictive Alerting are Critical for AIOps", AIOps Blog, https://www.bmc.com/blogs/why-event-noise-reduction-and-predictive-alerting-are-critical-for-aiops/, (Retrieved: May 4, 2023), 2021, 17 pages.

(Continued)

*Primary Examiner* — Sarai E Butler
(74) *Attorney, Agent, or Firm* — CANTOR COLBURN LLP; Nicholas Welling (57) ABSTRACT

Techniques are provided for dynamic alert suppression policy management. In one embodiment, the techniques involve receiving an event stream, wherein the event stream includes metric values comprising at least one of: log anomaly data and metric anomaly data, determining an anomalous event based on the event stream, determining a persistent region of the anomalous event, determining a quantum representation of the persistent region, determining X-Y values of the persistent region based on the quantum representation, and generating a policy based on a set of the X-Y values.

20 Claims, 4 Drawing Sheets

(56) References Cited

U.S. PATENT DOCUMENTS

| | | | | |
|---|---|---|---|---|
| 11,424,976 | B1* | 8/2022 | Adamo | H04L 41/22 |
| 12,033,048 | B1* | 7/2024 | Callot | G06F 18/214 |
| 12,094,467 | B1* | 9/2024 | Zhu | G10L 15/22 |
| 2015/0012308 | A1* | 1/2015 | Snyder | G06Q 10/02 |
| | | | | 705/5 |
| 2017/0132068 | A1* | 5/2017 | Parra | G06F 11/0793 |
| 2020/0285539 | A1* | 9/2020 | Fowler | G06N 10/60 |
| 2021/0203673 | A1 | 7/2021 | Dos Santos et al. | |
| 2022/0278889 | A1 | 9/2022 | Malleshaiah et al. | |
| 2023/0267031 | A1* | 8/2023 | Lozano | G06N 20/20 |
| | | | | 714/37 |

OTHER PUBLICATIONS

"APM Monitor", https://docs.datadoghq.com/monitors/create/types/apm/?tab=apmmetrics, (Retrieved: May 4, 2023), 1 page.

"nofm.error.count.min.size", IBM Operations Analytics Predictive Insights, https://www.ibm.com/docs/en/oapi/1.3.6?topic=properties-nofmerrorcountminsize, (Retrieved: May 4, 2023), 1 page.

"Notification Strategy", IBM Maximo Monitor, https://www.ibm.com/docs/en/maximo-monitor/continuous-delivery?topic=actions-notification-strategies, (Retrieved: May 4, 2023), 1 page.

"ServiceNow Event Management", Servicenow, 2020, 3 pages.

Anonymous, "Event Correlation Techniques for Combating Advanced Persistent Threats (APTS)", IPCOM000244914D, IP.com, Jan. 29, 2016, 5 pages.

Anonymous, "Method for Dynamic Event Aware Energy Reservation", IPCOM000262832D, IP.com, Jul. 5, 2020, 5 pages.

Anonymous, "Theory and Technology of a New Conversational AI System and Related Systems and Methods", IPCOM000271041D, IP.com, Oct. 1, 2022, 72 pages.

Kim, et al., "Polygraph: System for Dynamic Reduction of False Alerts in Large-Scale IT Service Delivery Environments", Usenix ATC, 2020, 6 pages.

* cited by examiner

DYNAMIC ALERT SUPPRESSION POLICY MANAGEMENT

BACKGROUND

The present disclosure relates to IT operations, and more specifically, to alert suppression policy management of artificial intelligence for IT operations (AIOps).

Traditional IT operations use system monitoring tools to generate alerts for potential anomalous events of the system. Site reliability engineers (SREs) can service the alerts, and resolve legitimate anomalous events indicated by the alerts. However, the alerts may be voluminous, and often do not notify the SREs of legitimate anomalous events. Further, the alerts may resolve without intervention from the SREs. Hence, the alerts are often unnecessary, and can decrease productivity of the SREs by impeding a workflow of the SREs.

SUMMARY

A method is provided according to one embodiment of the present disclosure. The method includes receiving an event stream, wherein the event stream includes metric values comprising at least one of: log anomaly data and metric anomaly data; determining an anomalous event based on the event stream; determining a persistent region of the anomalous event; determining a quantum representation of the persistent region; determining X-Y values of the persistent region based on the quantum representation; and generating a policy based on a set of the X-Y values.

A system is provided according to one embodiment of the present disclosure. The system includes a processor; and memory or storage comprising an algorithm or computer instructions, which when executed by the processor, performs an operation that includes: receiving an event stream, wherein the event stream includes metric values comprising at least one of: log anomaly data and metric anomaly data; determining an anomalous event based on the event stream; determining a persistent region of the anomalous event; determining a quantum representation of the persistent region; determining X-Y values of the persistent region based on the quantum representation; and generating a policy based on a set of the X-Y values.

A computer-readable storage medium having computer-readable program code embodied therewith, the computer-readable program code executable by one or more computer processors to perform an operation, is provided according to one embodiment of the present disclosure. The operation includes receiving an event stream, wherein the event stream includes metric values comprising at least one of: log anomaly data and metric anomaly data; determining an anomalous event based on the event stream; determining a persistent region of the anomalous event; determining a quantum representation of the persistent region; determining X-Y values of the persistent region based on the quantum representation; and generating a policy based on a set of the X-Y values.

DETAILED DESCRIPTION

Embodiments of the present disclosure improve upon AIOps by providing a dynamic policy module to manage alert suppression policies in IT environments. In one embodiment, the dynamic policy module generates an alert suppression policy by mapping data from an anomalous event to a "persistent region" of event data that does not include transient or self-resolving alerts. The dynamic policy module can determine X-Y values (e.g., values representing event counts and associated durations of anomalous events) of a quantum representation (e.g., a minimum duration) associated with the persistent region to generate a policy that hides, dismisses, or maintains alerts related to the anomalous events. In one embodiment, the policy includes metric names or metric identifiers that determine which metrics (and associated alerts) are covered under the policy. The policy can suppress or un-suppress alerts of the metrics covered under the policy based on a comparison of the X-Y values to event counts and associated durations of the metrics.

One benefit of the disclosed embodiments is to improve the efficiency of IT operations by using dynamic alert suppression policies to reduce the number of unnecessary alerts that reach SREs, thereby allowing SREs to focus on necessary workloads. Further, embodiments of the present disclosure can enable consistent and reliable alert suppression at scale, since alert suppression is performed via dynamic policy, which does not rely on individual SRE experience and knowledge.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
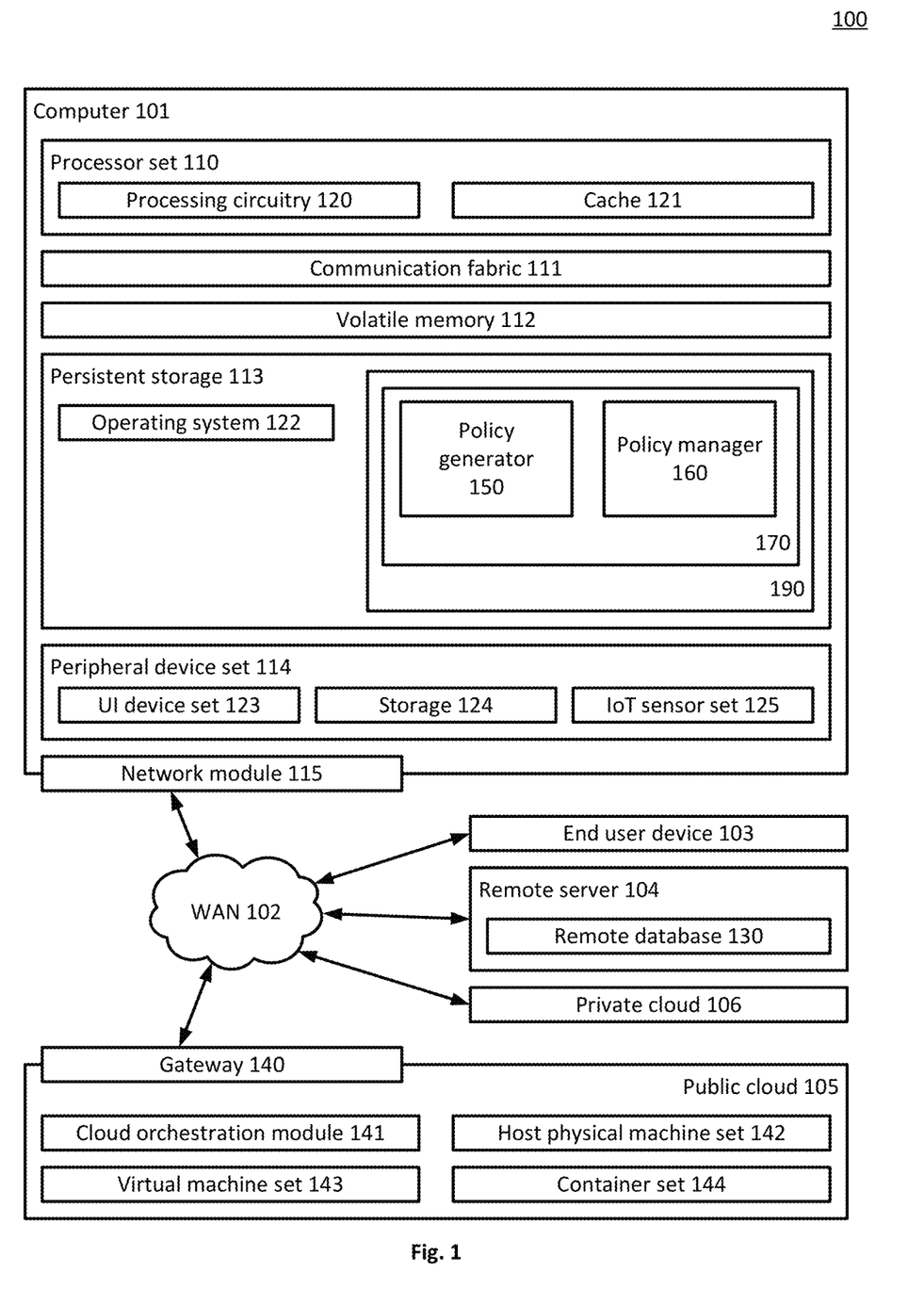
FIG. 1 illustrates a computing environment, according to one embodiment.

FIG. 1 illustrates a computing environment 100, according to one embodiment. Computing environment 100 contains an example of an environment for the execution of at least some of the computer code involved in performing the inventive methods, such as a new dynamic policy module 170, which includes a policy generator 150 and a policy manager 160, shown in block 190. In addition to block 190, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 190, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 190 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The code included in block 190 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
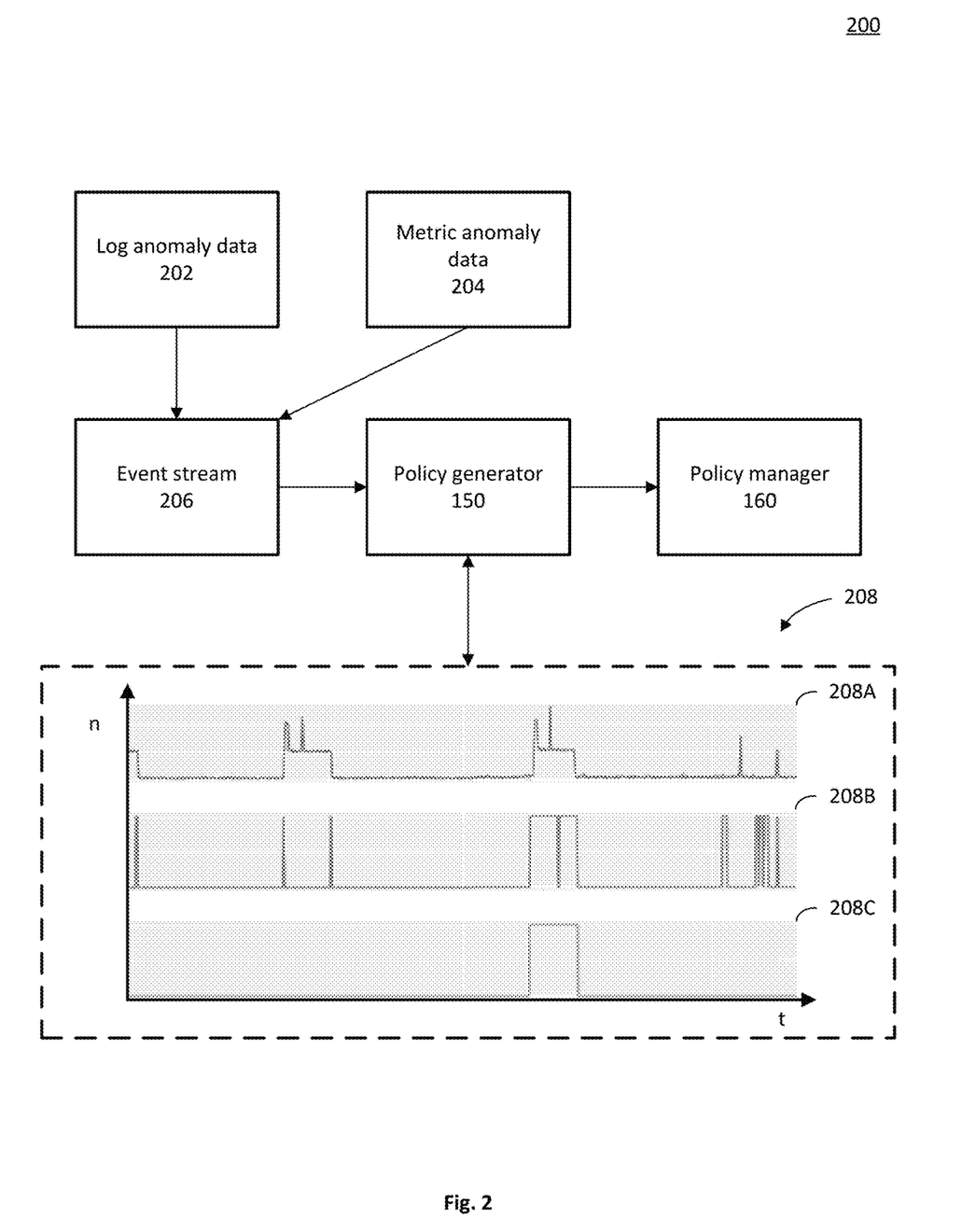
FIG. 2 illustrates a dynamic alert suppression policy environment, according to one embodiment.

FIG. 2 illustrates a dynamic alert suppression policy environment 200, according to one embodiment. In the illustrated embodiment, the dynamic alert suppression policy environment 200 includes log anomaly data 202, metric anomaly data 204, event stream 206, policy generator 150, policy generator input/output 208, and policy manager 160.

As previously discussed, the persistent storage 113 includes a dynamic policy module 170, which includes the policy generator 150 and the policy manager 160. In one embodiment, the dynamic policy module 170, the policy generator 150, and the policy manager 160 represent one or more algorithms, instruction sets, software applications, or other computer-readable program code that can be executed by the processor set 110 to perform the functions, operations, or processes described herein.

In one embodiment, the log anomaly data 202 is extracted from a log that includes timestamped data of events. In one embodiment, events represent notable information relevant to the functions, the performance capabilities, or the security of a system. The timestamped data can include resource information and associated metric information. Examples of resources include a client/server system, a CPU, a GPU, memory, a network bandwidth, or the like. Examples of metrics include a resource allotment, capacity, priority, temperature, utilization, or the like. The log can be input into a log anomaly detection algorithm that determines when data of the log deviates from expected data. The log anomaly detection algorithm then includes the resultant log anomaly data 202 in the event stream 206.

The metric anomaly data 204 can include time series event data such as timestamped resource-metric pairs that are generated from resource monitoring systems. For example, a CPU monitor of a host system may monitor a CPU-utilization pair and output a series of timestamped data points that identify what percentage of CPU capacity is utilized. The timestamps may span a duration that includes a time of a first CPU utilization that triggers an event, and a time of a second CPU utilization associated with the final resolution of the event. The timestamped resource-metric pairs can be input into a metric anomaly detection algorithm that determines when data of the timestamped resource-metric pairs deviate from expected data. The metric anomaly detection algorithm then includes the resultant metric anomaly data 204 in the event stream 206.

The event stream 206 can be input into the policy generator 150. In the illustrated embodiment, the event stream 206 is represented in graphical form of raw metric values 208A.

In the illustrated embodiment, the policy generator input/output 208 depicts the raw metric values 208A, anomalous events 208B determined from the raw metric values 208A, and persistent regions 208C of the anomalous events 208B on shared event count (n) and time (t) axises. The policy generator 150 can use the persistent regions 208C of the anomalous events 208B to determine X-Y values, and generate an alert suppression policy based on the X-Y values. These processes are discussed further in FIG. 3.

In one embodiment, the policy manager 160 updates the alert suppression policy in real-time to suppress unnecessary alerts in changing environments. Further, the policy manager 160 can incorporate user feedback to maintain, adjust, or replace the alert suppression policy. These processes are discussed in FIG. 4.

Figure 3:
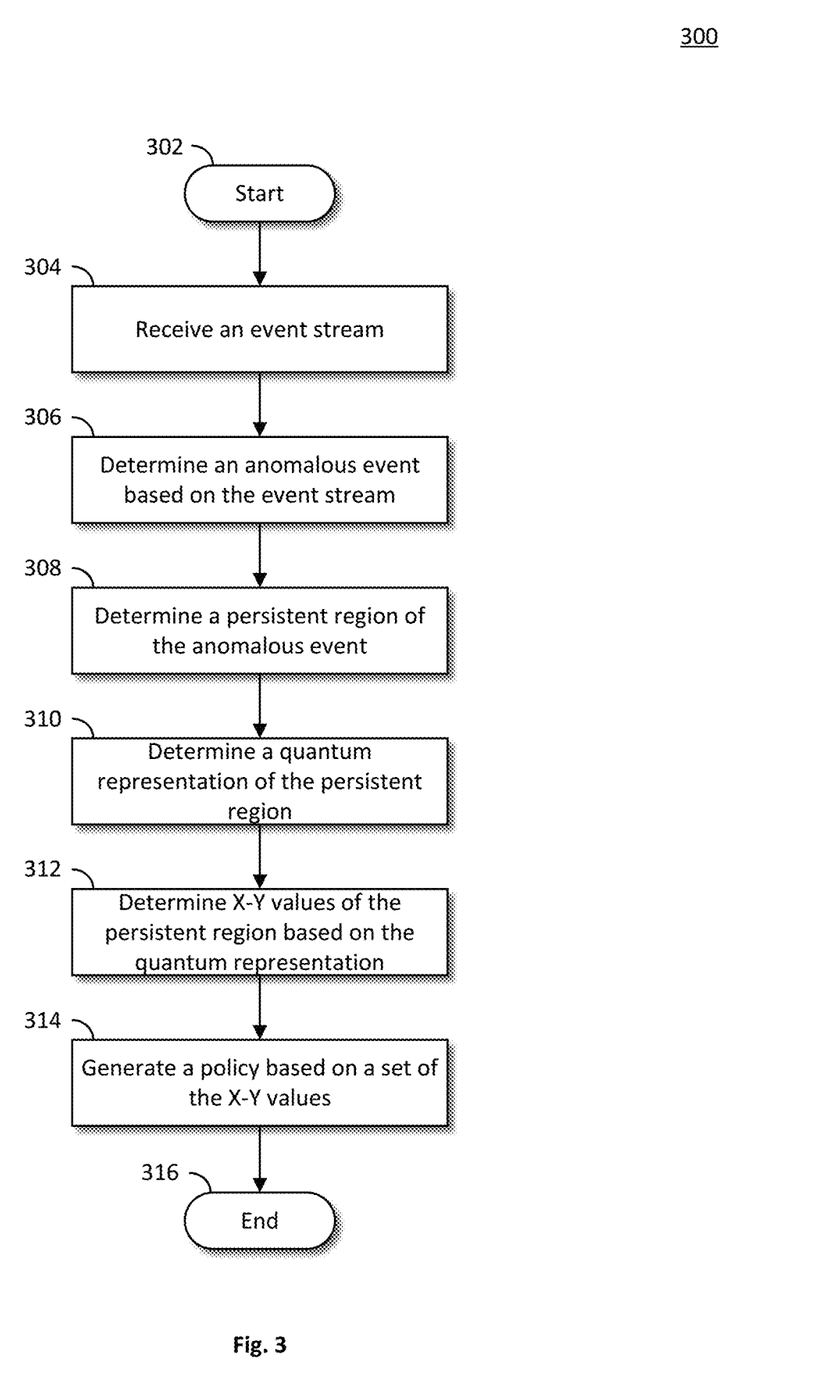
FIG. 3 illustrates a flowchart of a method of generating an alert suppression policy, according to one embodiment.

FIG. 3 illustrates a flowchart of a method 300 of generating an alert suppression policy, according to one embodiment. In one embodiment, an alert suppression policy represents a set of rules, guidelines, or actions that automatically execute actions, or abstain from taking action, to hide or dismiss alerts that are deemed unnecessary for an SRE or IT operator to resolve. The method begins at block 302.

At block 304, the policy generator 150 receives an event stream 206. As discussed above, in one embodiment, the event stream 206 includes log anomaly data 202 extracted from a log, and metric anomaly data 204 extracted from a resource monitor. Data of the event stream 206 can be depicted as the raw metric values 208A.

At block 306, the policy generator 150 determines an anomalous event based on the event stream 306. For example, the policy generator 150 can map a first set of metric values (illustrated as the leftmost set of metric values with a non-zero event count (n) in raw metric values 208A) to a first anomalous event (illustrated as the leftmost set of values with a non-zero event count of the anomalous events 208B). The policy generator 150 can map a second set of metric values (illustrated as the center-left set of metric values with a non-zero event count in raw metric values 208A) to a second and third anomalous event (illustrated as center-left sets of values with non-zero event counts of the anomalous events 208B).

At block 308, the policy generator 150 determines a persistent region of the anomalous event. In one embodiment, a persistent region includes a number of anomalous events that are active for a duration that exceeds a persistent region time threshold. The persistent region time threshold can be specific to each metric, and may be determined using historical data of anomalous event durations. In this manner, a persistent region can represent metrics for anomalous events yet to be resolved, but may not represent unnecessary (e.g., transient or self-resolving) anomalous events. For example, one persistent region may represent a CPU utilization, which includes 10 events corresponding to a 50-minute duration. Another persistent region may represent a network bandwidth utilization, which includes 20 events corresponding to a 30-minute duration.

Continuing the example set forth at block 306, in one embodiment, the policy generator 150 can map the second and third anomalous events (illustrated as center-right anomalous events with a non-zero event counts in the anomalous events 208B) to a persistent region (illustrated as the center-right region with a non-zero event count in persistent regions 208C). Although the embodiment illustrated in FIG. 2 shows one persistent region in the graphical representation of the persistent regions 208C, a given embodiment can include multiple persistent regions.

In one embodiment, the policy generator 150 determines a persistent region by identifying a deviation of metric values from a moving average of metric values (e.g., the non-zero values shown at the center-right of the raw metric values 208A) corresponding to the anomalous event (e.g., the non-zero values shown at center-right of the anomalous events 208B), or from a count of anomalous events (e.g., an event count, n, of the above-described anomalous event). The policy generator 150 can determine a given moving average by averaging multiple, consecutive data points captured within consecutive instances of a fixed, sliding time window applied to the metric values (e.g., the raw metric values 208A).

The deviation may occur when a fault causes a monitoring system to increase generation of alerts. For example, an application failure in a cloud environment may trigger a surge of anomalous events, which cause an event count (e.g., the event count, n, of policy generator input/output 208) to deviate from the moving average of an associated anomalous event. The policy generator 150 can determine the deviation by applying Bollinger bands to the moving average. Bollinger bands can include an upper band that is 2 standard deviates above the moving average, and a lower band that is 2 standard deviations below the moving average. Hence, a deviation occurs when an event count (n) exceeds a Bollinger band applied to the moving average of an anomalous event.

Afterwards, the policy generator 150 can determine whether the anomalous event is contiguous. In one embodiment, the anomalous event is contiguous when event counts (n) of captured by a fixed, sliding window applied to the anomalous event exceeds a contiguous threshold value. In this manner, the policy generator 150 can filter out isolated or transient anomalous events.

Upon determining that the anomalous event is contiguous and represents a deviation from an associated moving average, the policy generator 150 merges neighboring anomalous events that also satisfy these criteria. In one embodiment, the policy generator 150 determines that a first and second anomalous event are neighbors when there is some overlap in duration of the anomalous events (as established by starting and final timestamps of the respective anomalous events). The policy manager may also determine that the first and second anomalous events are neighbors when a time between respective durations of the anomalous events does not exceed a neighbor threshold.

At block 310, the policy generator 150 determines a quantum representation of the persistent region. As described above, the policy generator 150 may determine multiple persistent regions from anomalous events. The quantum representation can represent a minimum time duration common to these persistent regions. In one embodiment, the quantum representation is used to determine an average number of events (X) and an average associated duration (Y) of the multiple persistent regions, which can be inaccurate when calculated using event counts of the persistent regions, since each persistent region can span different durations.

At block 312, the policy generator 150 determines X-Y values of the persistent region based on the quantum representation. In one embodiment, the policy generator 150 determines X value candidates are determined as follows:

$$X(i) = Q \cdot \text{Duration}/P(i) \cdot \text{Duration} * P(i) \cdot \text{EventCount},$$

where $X(i)$ represents a number of events in the $i^{th}$-numbered persistent region of multiple persistent regions under consideration, Q.Duration represents a duration of the persistent region with the smallest duration of the multiple persistent regions (i.e., a duration of the quantum representation), $P(i)$.Duration represents a duration of the $i^{th}$-numbered persistent region of the multiple persistent regions, and $P(i)$.EventCount represents an event count (n) corresponding to the $i^{th}$-numbered persistent region of the multiple persistent regions.

A final X value can be determined from an average or a median value of the X value candidates. A final Y value can be determined from a duration of the quantum representation (e.g., the Q.Duration value).

At block 314, the policy generator 150 generates a policy based on a set of the X-Y values. In one embodiment, the policy generator 150 classifies the policy based on at least one of: the metrics associated with the persistent region, the resources associated with the persistent regions, a system classification (e.g., host ID) associated with the persistent region, or the like. The classification can determine which resources, metrics, and alerts are managed by the policy. For example, the policy generator 150 may classify the policy as covering alerts for utilization metrics of CPU resources.

The policy generator 150 can determine the set of X-Y values based on the classification of the policy. In one embodiment, the policy generator 150 aggregates X-Y values across multiple persistent regions associated with the classification. For example, when the classification includes 3 hosts that output 3 respective event streams that include CPU utilization metric values, the policy generator 150 can determine 3 respective sets of anomalous events corresponding to the 3 event streams, and then determine 3 respective sets of persistent regions corresponding to the 3 anomalous events. Each set of persistent regions may include multiple persistent regions. The X values can be determined from an average or median of the quantum representation applied to each of the persistent regions of the 3 sets of persistent regions that pertain to CPU utilization.

As discussed above, in one embodiment, the policy can automatically execute actions, or abstain from taking action, to hide or dismiss alerts that are deemed unnecessary for an SRE or IT operator to resolve. The policy may also maintain alerts for later resolution. The method 300 ends at block 316.

Figure 4:
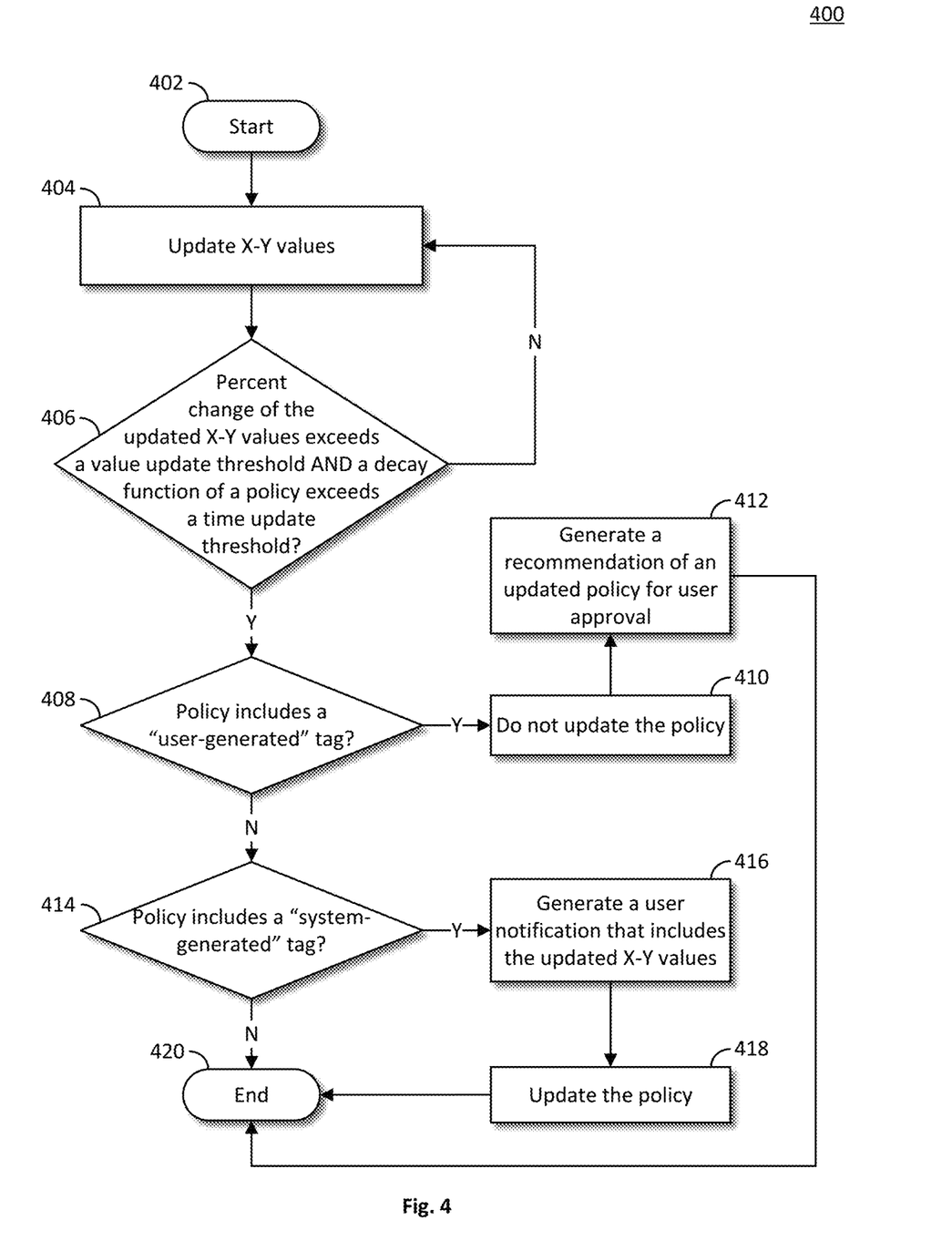
FIG. 4 illustrates a flowchart of a method of managing an alert suppression policy, according to one embodiment.

FIG. 4 illustrates a flowchart of a method 400 of managing an alert suppression policy, according to one embodiment. The method 400 begins at block 402.

In one embodiment, when sources of anomalous events (e.g., a system fault) occur at run-time, the policy manager 160 can select a policy to apply based on a comparison of a classification of the policy, and a resource or metric of the fault. For example, if the fault triggers an increase in CPU utilization metric outputs, the policy manager 160 may select a policy classified for the CPU utilization resource-metric pair.

Upon identifying a match, the policy manager 160 can implement the selected policy based on the X-Y values of the policy. For example, the policy manager 160 can compare the X value of the policy to a running event count (n) of an anomalous event corresponding to the fault, and compare the Y value of the policy to a duration of the anomalous event. The policy manager 160 may then suppress alerts when the X-Y values are not exceeded, and un-suppress alerts when the X-Y values are exceeded. In this manner, the X-Y values of the policy can serve as thresholds to determine which rules of the policy apply to dismiss or maintain alerts related to the anomalous event.

At block 404, the policy manager 160 updates X-Y values. In one embodiment, the policy manager 160 receives current X-Y values from the policy generator 150, or determines X-Y values of an anomalous event using a process similar to the process described in FIG. 3. The updated X-Y values may be generated continuously, and stored in persistent storage 113 or volatile memory 112.

At block 406, the policy manager 160 determines whether a percent change of the updated X-Y values exceeds a value update threshold, and whether a decay function of a policy exceeds a time update threshold. In one embodiment, the criteria ensure that new X values are relatively stable, and that potential updates to the policy can occur in regular intervals. Upon determining that either of these criteria are not satisfied, the policy manager 160 does not update the policy. Rather, the method 400 proceeds to block 404, where the policy manager 160 updates the X-Y values as described above. However, upon determining that both of the criteria are satisfied, the policy manager 160 updates the policy based on tags associated with the policy, as described at blocks 408-418.

At block 408, the policy manager 160 determines whether the policy includes a "user-generated" tag. The policy manager 160 can attach the user-generated tag to the policy when the user defines elements of the policy that were not generated by the policy generator 150. For instance, a user can choose to alter X-Y values, or manually select alerts to be dismissed, delayed, or resolved. When the policy manager 160 encounters the user-generated tag, it determines that the user has an expertise or authority that supersedes that of the dynamic policy module 170. Hence, upon determining that the policy does include a "user-generated" tag, the method 400 proceeds to block 410, where the policy manager 160 forgoes updating the policy. At block 412, the policy manager 160 (in lieu of updating the policy) generates a recommendation of an updated policy for user approval. The method 400 then proceeds to block 420, where the method 400 ends.

Returning to block 408, upon determining that the policy does not include a "user-generated" tag, the method 400 proceeds to block 414. At block 414, the policy manager 160 determines whether the policy includes a "system-generated" tag. Upon determining that the policy does include a "system-generated" tag, the method 400 proceeds to block 416, where the policy manager 160 generates a user notification that includes the updated X-Y values, which may be reviewed and used by the user to accept or change the current policy. At block 418, the policy manager 160 updates the policy (assuming no changes were made to the policy by the user). The method 400 then proceeds to block 420, where the method 400 ends. Returning to block 414, upon determining that the policy does not include a "system-generated" tag, the method 400 proceeds to block 420, where the method 400 ends.

While the foregoing is directed to embodiments of the present invention, other and further embodiments of the invention may be devised without departing from the basic scope thereof, and the scope thereof is determined by the claims that follow.

What is claimed is:

1. A method comprising:
   receiving an event stream, wherein the event stream includes metric values comprising at least one of: log anomaly data and metric anomaly data;
   determining an anomalous event based on the event stream;
   determining a persistent region of the anomalous event;
   determining a quantum representation of the persistent region;
   determining X-Y values of the persistent region based on the quantum representation; and
   generating a policy based on a set of the X-Y values.

2. The method of claim 1, wherein the policy is selected at run-time based on a match between a classification of the policy and a resource or metric name, wherein the policy is applied based on a comparison between the X-Y values and an event count and duration of the metric values.

3. The method of claim 1, wherein the persistent region represents a set of metric values corresponding to the anomalous event, wherein the set of metric values excludes metric values corresponding to transient or self-resolving anomalous events, and wherein determining the persistent region comprises:
   determining deviations of the set of metric values based on a moving average of an event count of the anomalous event or a moving average of the set of metric values; and
   determining that the anomalous event is contiguous.

4. The method of claim 1, wherein the quantum representation represents a minimum time duration common to at least one persistent region.

5. The method of claim 1, wherein determining an X value of the X-Y values is determined as an average or median value of candidate X values determined as $X(i)=Q.Duration/P(i).Duration*P(i).EventCount$, wherein $X(i)$ represents a number of events in an $i^{th}$-numbered persistent region of a list of multiple persistent regions, Q.Duration represents a duration of the quantum representation, $P(i)$.Duration represents a duration of the $i^{th}$-numbered persistent region, and $P(i)$.EventCount represents an event count corresponding to the $i^{th}$-numbered persistent region, and wherein a Y value of the X-Y values represents Q.Duration.

6. The method of claim 1, further comprising automatically executing the policy to hide, dismiss, or maintain alerts associated with the anomalous event data.

7. The method of claim 1, further comprising:
   updating the X-Y values; and
   upon determining that a percent change of the updated X-Y values exceeds a value update threshold, and upon determining that a decay function of the policy exceeds a time update threshold, updating, changing, or maintaining the policy based on a tag associated with the policy.

8. A system, comprising:
   a processor; and
   memory or storage comprising an algorithm or computer instructions, which when executed by the processor, performs an operation comprising:
   receiving an event stream, wherein the event stream includes metric values comprising at least one of: log anomaly data and metric anomaly data;
   determining an anomalous event based on the event stream;
   determining a persistent region of the anomalous event;
   determining a quantum representation of the persistent region;
   determining X-Y values of the persistent region based on the quantum representation; and
   generating a policy based on a set of the X-Y values.

9. The system of claim 8, wherein the policy is selected at run-time based on a match between a classification of the policy and a resource or metric name, wherein the policy is applied based on a comparison between the X-Y values and an event count and duration of the metric values.

10. The system of claim 8, wherein the persistent region represents a set of metric values corresponding to the anomalous event, wherein the set of metric values excludes metric values corresponding to transient or self-resolving anomalous events, and wherein determining the persistent region comprises:
    determining deviations of the set of metric values based on a moving average of an event count of the anomalous event or a moving average of the set of metric values; and
    determining that the anomalous event is contiguous.

11. The system of claim 8, wherein the quantum representation represents a minimum time duration common to at least one persistent region.

12. The system of claim 8, wherein determining an X value of the X-Y values is determined as an average or median value of candidate X values determined as $X(i)=Q.Duration/P(i).Duration*P(i).EventCount$, wherein $X(i)$ represents a number of events in an $i^{th}$-numbered persistent region of a list of multiple persistent regions, Q.Duration represents a duration of the quantum representation, $P(i)$.Duration represents a duration of the $i^{th}$-numbered persistent region, and $P(i)$.EventCount represents an event count corresponding to the $i^{th}$-numbered persistent region, and wherein a Y value of the X-Y values represents Q.Duration.

13. The system of claim 8, the operation further comprising automatically executing the policy to hide, dismiss, or maintain alerts associated with the anomalous event data.

14. The system of claim 8, the operation further comprising:
updating the X-Y values; and
upon determining that a percent change of the updated X-Y values exceeds a value update threshold, and upon determining that a decay function of the policy exceeds a time update threshold, updating, changing, or maintaining the policy based on a tag associated with the policy.

15. A computer-readable storage medium having a computer-readable program code embodied therewith, the computer-readable program code executable by one or more computer processors to perform an operation comprising:
receiving an event stream, wherein the event stream includes metric values comprising at least one of: log anomaly data and metric anomaly data;
determining an anomalous event based on the event stream;
determining a persistent region of the anomalous event, wherein the quantum representation represents a minimum time duration common to at least one persistent region;
determining a quantum representation of the persistent region;
determining X-Y values of the persistent region based on the quantum representation; and
generating a policy based on a set of the X-Y values.

16. The computer-readable storage medium of claim 15, wherein the policy is selected at run-time based on a match between a classification of the policy and a resource or metric name, wherein the policy is applied based on a comparison between the X-Y values and an event count and duration of the metric values.

17. The computer-readable storage medium of claim 15, wherein the persistent region represents a set of metric values corresponding to the anomalous event, wherein the set of metric values excludes metric values corresponding to transient or self-resolving anomalous events, and wherein determining the persistent region comprises:
determining deviations of the set of metric values based on a moving average of an event count of the anomalous event or a moving average of the set of metric values; and
determining that the anomalous event is contiguous.

18. The computer-readable storage medium of claim 15, wherein determining an X value of the X-Y values is determined as an average or median value of candidate X values determined as $X(i)=Q.Duration/P(i).Duration*P(i).EventCount$, wherein $X(i)$ represents a number of events in an $i^{th}$-numbered persistent region of a list of multiple persistent regions, Q.Duration represents a duration of the quantum representation, $P(i)$.Duration represents a duration of the $i^{th}$-numbered persistent region, and $P(i)$.EventCount represents an event count corresponding to the $i^{th}$-numbered persistent region, and wherein the Y value of a X-Y values represents Q.Duration.

19. The computer-readable storage medium of claim 15, the operation further comprising automatically executing the policy to hide, dismiss, or maintain alerts associated with the anomalous event data.

20. The computer-readable storage medium of claim 15, the operation further comprising:
updating the X-Y values; and
upon determining that a percent change of the updated X-Y values exceeds a value update threshold, and upon determining that a decay function of the policy exceeds a time update threshold, updating, changing, or maintaining the policy based on a tag associated with the policy.

* * * * *